US008045758B2

(12) United States Patent
Ishikawa

(10) Patent No.: US 8,045,758 B2
(45) Date of Patent: Oct. 25, 2011

(54) CONDUCT INFERENCE APPARATUS

(75) Inventor: Takahiro Ishikawa, Nagoya (JP)

(73) Assignee: DENSO CORPORATION, Kariya (JP)

( * ) Notice: Subject to any disclaimer, the term of this patent is extended or adjusted under 35 U.S.C. 154(b) by 739 days.

(21) Appl. No.: 12/216,728

(22) Filed: Jul. 10, 2008

(65) Prior Publication Data

US 2009/0034794 A1      Feb. 5, 2009

(30) Foreign Application Priority Data

Aug. 3, 2007   (JP) ................. 2007-203111

(51) Int. Cl.
*G06K 9/00* (2006.01)
(52) U.S. Cl. ....................... 382/103; 382/107
(58) Field of Classification Search .......... 382/103–107; 710/5.8
See application file for complete search history.

(56) References Cited

U.S. PATENT DOCUMENTS

| 2005/0157908 | A1* | 7/2005 | Matsugu et al. ............. 382/107 |
| 2006/0040679 | A1* | 2/2006 | Shikano et al. ............. 455/457 |
| 2008/0130953 | A1 | 6/2008 | Ishikawa |

FOREIGN PATENT DOCUMENTS

| JP | 09-270010 A | 10/1997 |
| JP | 2003-109015 A | 4/2003 |
| JP | 2004-328622 | * 11/2004 |
| JP | A-2004-328622 | 11/2004 |
| JP | A-2005-202653 | 7/2005 |
| JP | 2005-205943 A | 8/2005 |

OTHER PUBLICATIONS

Verified English translation and Notice of Reason for Rejection issued from the Japanese Patent Office dated Aug. 14, 2009 in corresponding Japanese patent application No. 2007-203111 (English outline of the Notice was submitted with the Information Disclosure Statement on Sep. 24, 2009).
Viola, Paul and Jones, Michael, *Robust Real-time Object Detection*, Second International Workshop on Statistical and Computational Theories of Vision—Modeling, Learning, Computing, and Sampling, Vancouver, Canada (Jul. 13, 2001).
Notice of Reason for Rejection issued from the Japanese Patent Office mailed on Aug. 4, 2009 in the corresponding Japanese patent application No. 2007-203111 (and English translation).
Cristinacce, David, Cootes, Tim and Scott, Ian, *A Multi-Stage Approach to Facial Feature Detection*, Dept. Imaging Science and Biomedical Engineering, University of Manchester, BMVC 2004, U.K, Kingston, Sep. 7-9, 2004.

* cited by examiner

*Primary Examiner* — Vu Le
*Assistant Examiner* — Amara Abdi
(74) *Attorney, Agent, or Firm* — Posz Law Group, PLC

(57) ABSTRACT

In a conduct inference process, feature points are extracted from a capture image. The extracted feature points are collated with conduct inference models to select conduct inference models in each of which an accordance ratio between a target vector and a movement vector is within a tolerance. Among the selected conduct inference models, one conduct inference model in which a distance from a relative feature point to a return point is shortest is selected. Then, a specific conduct designated in the selected conduct inference model is tentatively determined as a specific conduct the driver intends to perform. Furthermore, based on the tentatively determined specific conduct, it is determined whether the specific conduct is probable. When it is determined that the specific conduct is probable, an alarm process is executed to output an alarm to the driver.

5 Claims, 6 Drawing Sheets

CONDUCT INFERENCE APPARATUS

CROSS REFERENCE TO RELATED APPLICATION

This application is based on and incorporates herein by reference Japanese Patent Application No. 2007-203111 filed on Aug. 3, 2007.

FIELD OF THE INVENTION

The present invention relates to a conduct inference apparatus which infers a conduct performed by a person imaged in a capture image.

BACKGROUND OF THE INVENTION

A conduct inference apparatus in a vehicle is conventionally known as having an image capture device and an image processor. The image capture device captures an image of a driver etc.; the image processor determines whether the driver is performing a specific conduct such as using a cellular phone based on an image captured (referred to as a capture image) (see Patent Document 1).

In the conduct inference apparatus in Patent Document 1, when in a capture image a predetermined region peripheral to a face continues to contain a hand for a predetermined time period or longer, the driver is determined to be performing the specific conduct.

That is, whether the driver is performing a specific conduct is determined based on only whether the hand is located at a position when the specific conduct is being performed.

Patent document 1: JP-2005-205943 A

Therefore, in the conduct inference apparatus in Patent document 1, the specific conduct can be detected only after already having been performed. Thus, a measurement for anticipating the specific conduct cannot be taken so as to run the vehicle safely such as outputting an alarm to the driver, for example.

SUMMARY OF THE INVENTION

It is an object of the present invention to provide a conduct inference apparatus which can detect, in advance, intending to perform a specific conduct.

According to an example of the present invention, a conduct inference apparatus is provided as follows. A capture image acquiring means is configured for acquiring a capture image, in which a person is imaged, each time the capture image is taken. A feature point detecting means is configured for detecting, as a detection feature point, a feature point, which is designated on a body of the person, in the capture image each time the capture image is acquired. A model storing means is configured for storing at least one conduct inference model which designates a return point, a transit region, and a conduct direction with respect to a specific conduct. The return point is a point at which the feature point of the person is located when the person is performing the specific conduct. The transit region is a region which the feature point passes through towards the return point when the person intends to perform the specific conduct. The conduct direction is a direction in which the feature point moves while passing through the transit region when the person intends to perform the specific conduct. A model extracting means is configured for extracting from the at least one conduct inference model one conduct inference model, in which the detection feature point detected by the feature detecting means is within the transit region and a movement direction of the detection feature point is along the conduct direction. A conduct inferring means is configured for inferring that the person imaged in the capture image intends to perform a specific conduct corresponding to the extracted one conduct inference model.

According to another example of the present invention, a method for inferring a specific conduct by a driver in a vehicle is provided by comprising: storing at least one conduct inference model which designates a return point, a transit region, and a conduct direction with respect to a specific conduct, the return point being a point at which a feature point designated on a body of the driver is located when the driver is performing the specific conduct, the transit region being a region which the feature point passes through towards the return point when the driver intends to perform the specific conduct, the conduct direction being a direction in which the feature point moves while passing through the transit region when the driver intends to perform the specific conduct; acquiring a capture image of the driver, each time the capture image is taken; detecting, as a detection feature point, the feature point of the driver in the capture image each time the capture image is acquired; extracting from the at least one conduct inference model one conduct inference model, in which the detection feature point is within the transit region and a movement direction of the detection feature point is along the conduct direction; and inferring that the driver imaged in the capture image intends to perform a specific conduct corresponding to the extracted one conduct inference model.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
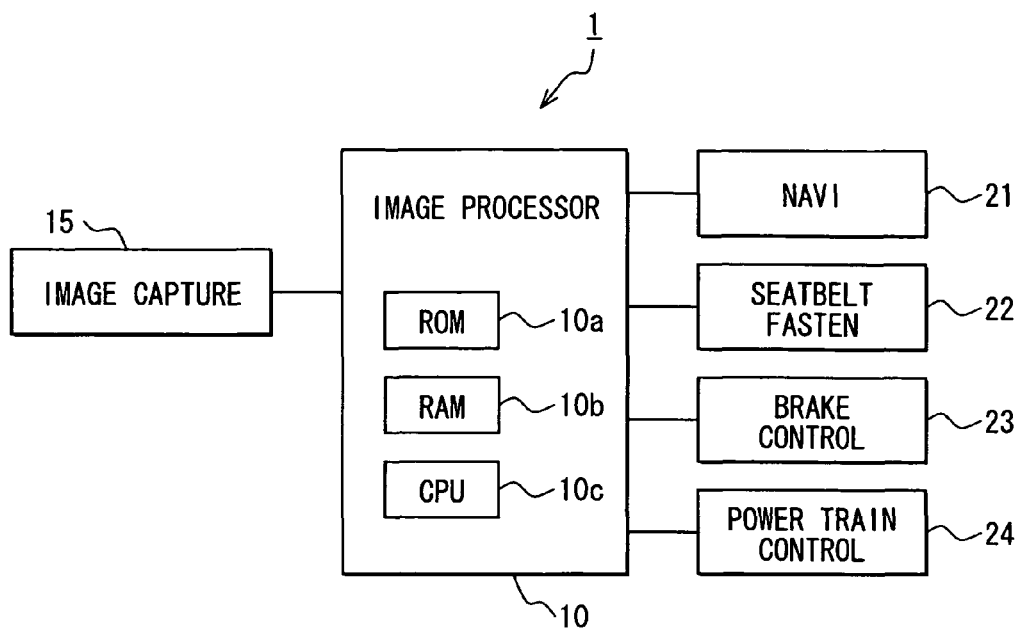
FIG. 1 is a block diagram illustrating a configuration of a conduct inference apparatus according to an embodiment of the present invention.

Hereafter, description will be given to an embodiment of the present invention with reference to the drawings. FIG. 1 is a block diagram illustrating a schematic configuration of a conduct inference apparatus provided in a subject vehicle according to an embodiment of the present invention.

<Configuration>

The conduct inference apparatus 1 includes the following: an image capture device 15 which captures an image or takes a capture image of an occupant in the subject vehicle; a navigation apparatus 21 which outputs an alarm in addition to performing well-known route guidance etc.; a seatbelt fastening device 22 which fastens to roll round a seatbelt of the driver's seat; a braking device 23 which controls braking force of the brake; a power train control device 24 which controls driving force outputted by a power train mechanism; and an image processor 10 which processes an image captured (referred to as a capture image) by the image capture device 15 to thereby infer a conduct of an occupant in the subject vehicle. Further, based on an inference result, the image processor 10 controls the navigation apparatus 21, braking device 23, or the like.

Figure 2:
FIG. 2 is an example of a capture image.

The image capture device 15 is a known digital camera, which is arranged near the base of a room mirror protruded from a ceiling board or windshield of the subject vehicle while turning the lens to view an interior of the vehicle. The image capture device 15 outputs capture images to the image processor 10 one by one sequentially. In addition, as illustrated in FIG. 2, a capture image of the image capture device 15 includes at least the upper half of the body of the occupant or driver, namely, the head, both arms, both hands, the torso, etc.) of the driver who is seated on the driver's seat.

The navigation apparatus 21 includes a speaker to output sounds, a monitor to display images, and a control device to control the speaker and the monitor according to a control instruction (signal) from the image processor 10. The control device executes a well-known present position display process, route designation process, route guidance process, etc.

In addition, the seatbelt fastening device 22 rolls round the seatbelt of the driver's seat to increase binding force of the seatbelt.

Furthermore, the braking device 23 controls a brake actuator which opens and closes a pressure increase valve or pressure decrease valve according to a control instruction from the image processor 10.

Furthermore, the power train control device 24 controls a throttle actuator, which adjusts a throttle opening of the internal combustion engine, and a transmission control device, which adjusts an output torque of the transmission according to a control instruction from the image processor 10.

<Image Processor>

Next, the image processor 10 is explained. The image processor 10 includes a known microcomputer having a ROM 10a to store execution programs, a RAM 10b to temporarily store data, and a CPU 10c to execute various processes according to the execution program stored in the RAM 10b or ROM 10a.

The ROM 10a stores an execution program, which determines whether the driver intends to perform a predetermined specific conduct by successively processing capture images from the image capture device 15 and, thereafter, outputs a control instruction to the navigation apparatus 21 based on the determination result that the driver intends to or is going to perform the specific conduct.

Furthermore, the ROM 10a stores (i) a feature point list referred to when executing the conduct inference process, and (ii) a conduct inference model group. The feature point list is used for detecting a feature point, which is previously designated on the human body or anatomy of the driver imaged or captured in the capture image. The feature point list includes at least (i) an arm portion list for detecting a feature point designated on an arm portion of the human body, and (ii) a head portion list for detecting a feature point designated on a head portion or face of the human body.

Figure 3:
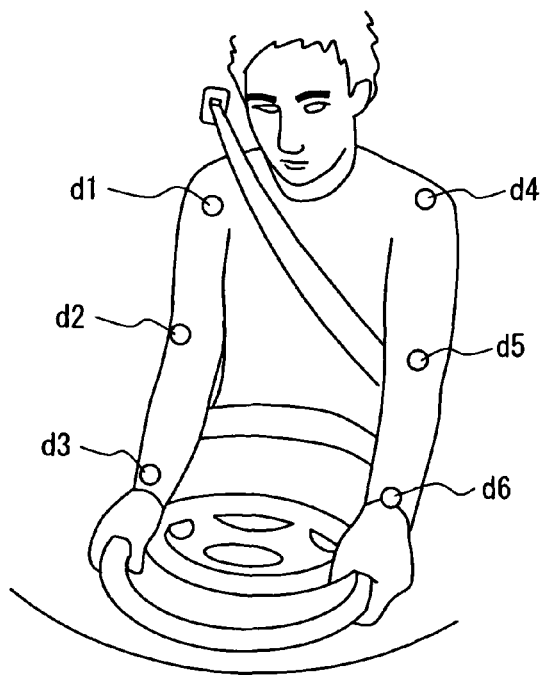
FIG. 3 is a diagram illustrating feature points designated in arm portions.

As illustrated in FIG. 3, the arm portion list designates as feature points a right shoulder d1, a left shoulder d4, a right elbow d2, a left elbow d5, a right wrist d3, and a left wrist d6.

Figure 4A:
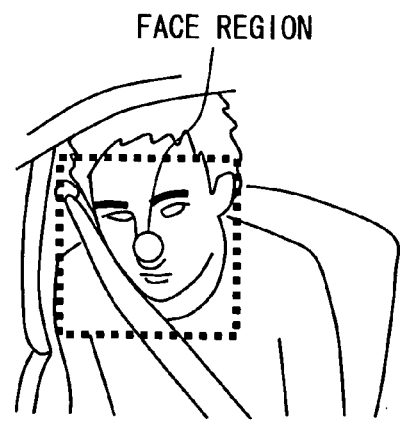
FIG. 4A is a diagram illustrating a template for detecting a face feature point.
Figure 4B:
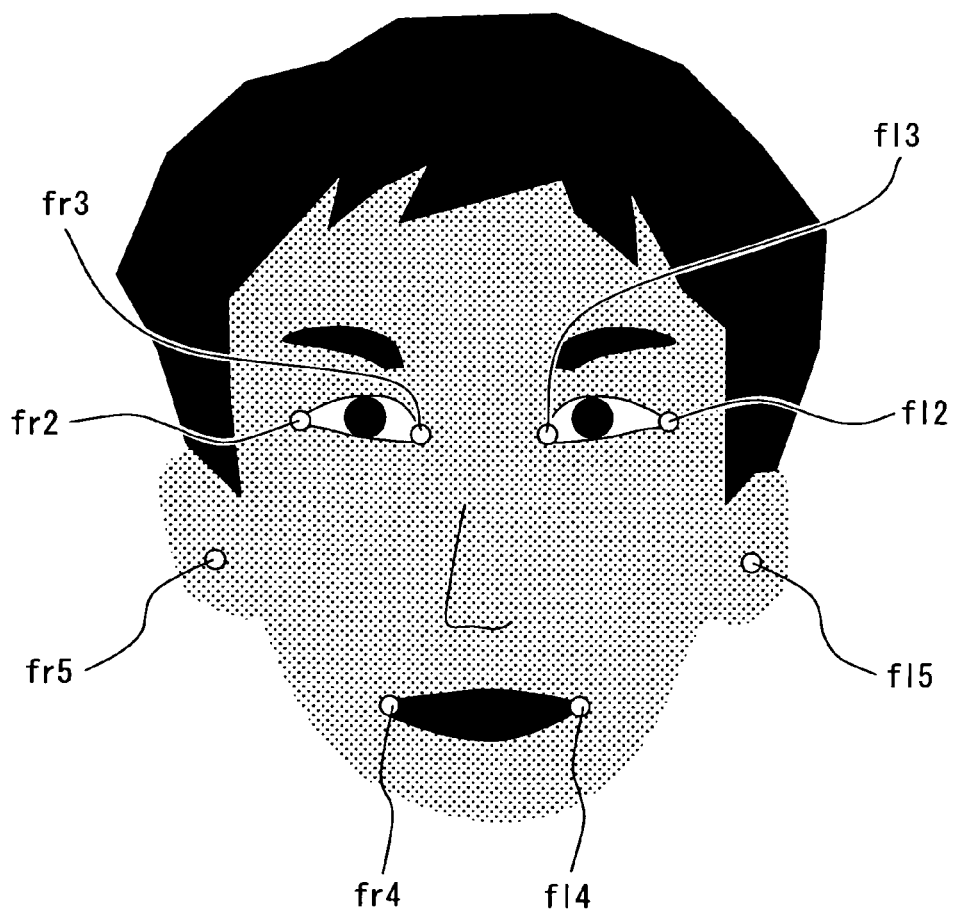
FIG. 4B is a diagram illustrating feature points designated in face portions.

Furthermore, the head portion list includes a face detecting template shown in FIG. 4A and a face feature point detecting template in FIG. 4B. The face detecting template is used for detecting a nose f1 of the face and thereby extracting a face region where the detected nose f1 is centered. The face feature point detecting template is used for designating as feature points an inner corner of a right eye fr3 of the face, an inner corner of a left eye fl3, an outer corner of a right eye fr2, an outer corner of a left eye fl2, a right mouth corner fr4, a left mouth corner fl4, a tragus or antilobium (a prominence of skin-covered cartilage forming the front wall of the ear canal) fr5 of a right ear, and a tragus fl5 of a left ear.

<Conduct Inference Model>

The conduct inference model group includes multiple conduct inference models. Each conduct inference model is predetermined to correspond to as a detection target a specific conduct for determining whether a person intends to perform the specific conduct based on movement of feature points detected in a capture image.

Each conduct inference model includes a return point, a return region, a transit region, and a permission range or tolerance of a conduct direction (or a conduct direction permission range or tolerance), with respect to a corresponding specific conduct performed by a person. The return point is a point at which a feature point of the person intending to perform the specific conduct converges or arrives. In other words, the feature point of the person who is performing the specific conduct is located at the return point. The return region is a region where the feature point of the person who is regarded as having performed or being performing the specific conduct is located. The transit region is a region through which the feature point of the person intending to perform the specific conduct passes in order to reach the return point. The conduct direction permission range is a range permitted for a movement direction in which the feature point of the person intending the specific conduct passes through the transit region.

Herein, in the present embodiment, the return region and the transit region are expressed by a relative coordinate system having an origin at the return point. In addition, the number of transit regions designated to one conduct inference model may be single or multiple according to a distance from the return point. If the multiple transit regions are designated, multiple conduct direction permission ranges need to be designated.

Figure 8:
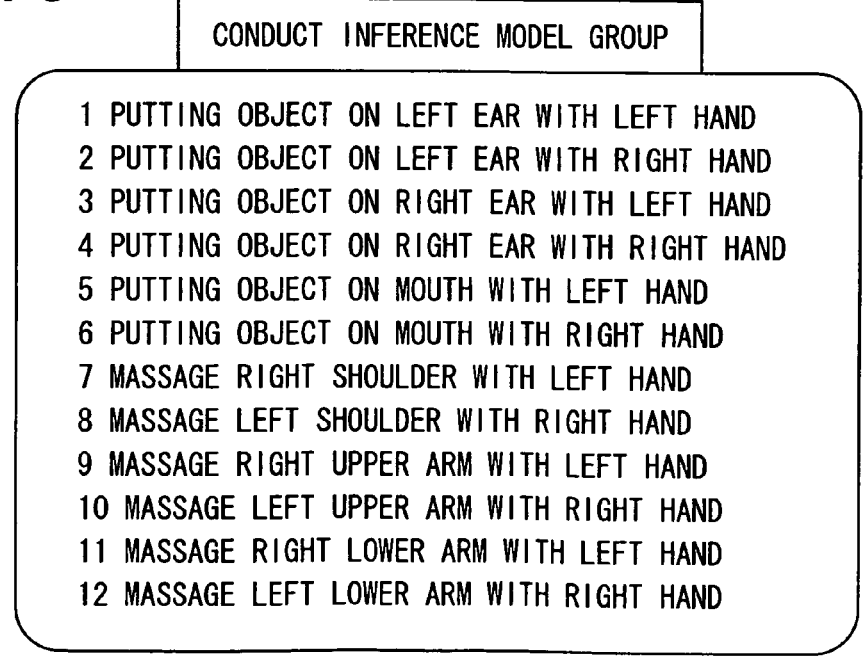
FIG. 8 is a diagram illustrating a conduct inference model group of specific conducts.

For instance, the present embodiment specifies as a detection target each of specific conducts shown in FIG. 8. A cellular phone using conduct as a specific conduct is specified in which a person puts an object such as a cellular phone onto the right or left ear with the right or left hand, respectively. A smoking conduct is specified in which a person puts an object such as a cigarette onto a mouth with the right or left hand. A massaging conduct is specified in which a person massages the left shoulder, left upper arm, or left lower arm with the right hand, or in which a person massages the right shoulder, right upper arm, or right lower arm with the left hand.

Accordingly, each return point is designated as follows. The cellular phone using conduct has a return point at the left or right tragus of the ear. The smoking conduct has a return point at a middle point between the right and left corners of the mouth. Each massaging conduct has a return point at a point at the left or right shoulder, at a middle point between the left or right shoulder and the left or right elbow, or at a middle point between the left or right elbow and the left or right wrist.

The present embodiment performs the following procedures in order to designate a return region and a transit region with respect to each conduct inference model. First, multiple subjects (or tested persons) are selected as being assumed to be sufficient or reliable for statistics, and are required to perform a specific conduct. The state of each subject taking place when the specific conduct is being performed is captured as capture images relative to each subject. With respect to each of subjects, the feature point relative to the specific conduct is detected in the capture images and averaged. Averaged feature points with respect to all the subjects are distributed to thereby obtain a return region of the feature point; further, an average of the distribution of the averaged feature points can be designated as a return point, for instance.

Next, all the subjects are required to perform a bodily movement from a state prior to starting the specific conduct to a state where the specific conduct is being performed. States during the bodily movement are successively or sequentially captured in the capture images. Each feature point of each subject is detected in all the capture images relative to each subject. A transit region of each feature point is designated in which each feature point is regarded (or certified by the designer) as moving to reach the corresponding return point.

Furthermore, the average of directions in which the feature point moves within the transit region is designated as a conduct direction. Simultaneously, a conduct direction permission range is designated as including a deviated range from the conduct direction. That is, the image processor 10 can execute a conduct inference process by comparing or collating the detected feature point (referred to as detection feature points), which is based on the capture images, with each conduct inference model.

<Conduct Inference Process>

Next, the conduct inference process executed by the image processor 10 is explained.

Figure 5:
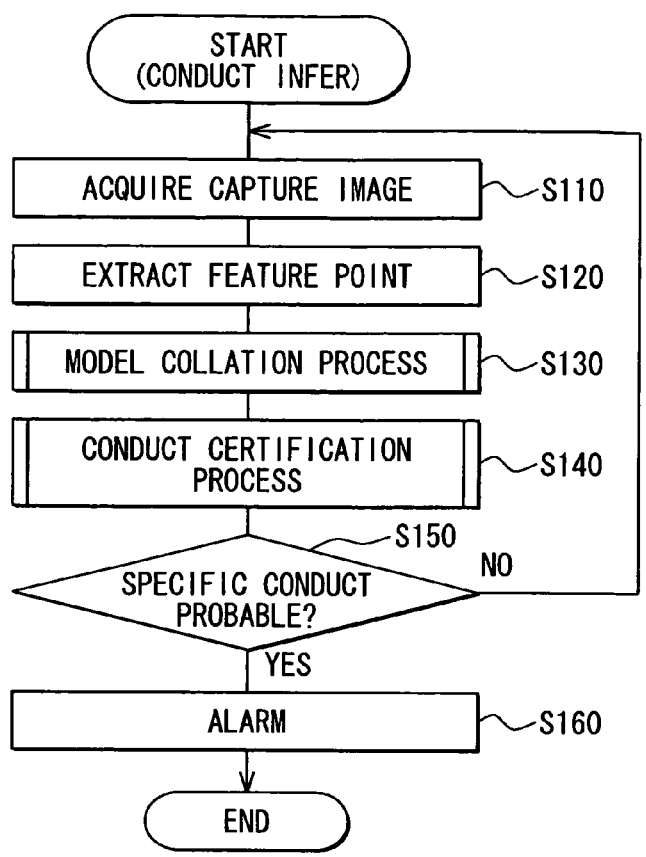
FIG. 5 is a flowchart of a conduct inference process.

FIG. 5 is a flowchart of a conduct inference process. The execution of the conduct inference process is started when the image processor 10 is activated. With the image processor 10 operated, the execution of the conduct inference process is repeated. At S110, a capture image taken by the image capture device 15 is acquired.

At S120, all the feature points of the driver imaged in the capture image are extracted by collating with the feature point list.

With respect to such extracting processing, Patent Document 2 discloses extraction of feature points designated in the arm portion list, for example; Patent Document 3 discloses extraction of feature points designated in the head portion list, for example. Thus, explanation for such extraction is omitted herein.

Patent Document 2: JP-2003-109015 A
Patent Document 3: JP-H09-270010 A

Furthermore, at S130, the feature points extracted at S120 are compared or collated with the conduct inference models stored in the ROM 10b to thereby execute a model collation process for determining whether the driver intends to perform a specific conduct.

At S140, a conduct certification process is executed to determine whether the determination result from the model collation process at S130 is reliable or probable. That is, the conduct certification process determines whether the specific conduct is probable, the specific conduct which the model collation process determines that the driver intends to perform.

At S150, it is determined whether the specific conduct intended by the driver is probable based on the result of the conduct certification process at S140. When it is determined to be probable, the processing proceeds to S160. For instance, at S150 of the present embodiment, if a determined conduct flag to be mentioned later is in the high level, the specific conduct should be probable.

At S160, an alarm process is executed to output an alarm to the driver. The process is then once ended and re-stats at S110. In the alarm process of the present embodiment, for instance, a control instruction is outputted to the navigation apparatus 21, which thereby displays warning on the monitor while outputting an alarm via the speaker. This can warn that intending to perform the specific conduct during operation of the vehicle is dangerous.

When it is determined that the specific conduct the driver intends to perform is not probable, the processing returns to S110.

<Model Collation Process>

Next, the model collation process executed at S130 of the conduct inference process is explained.

Figure 6:
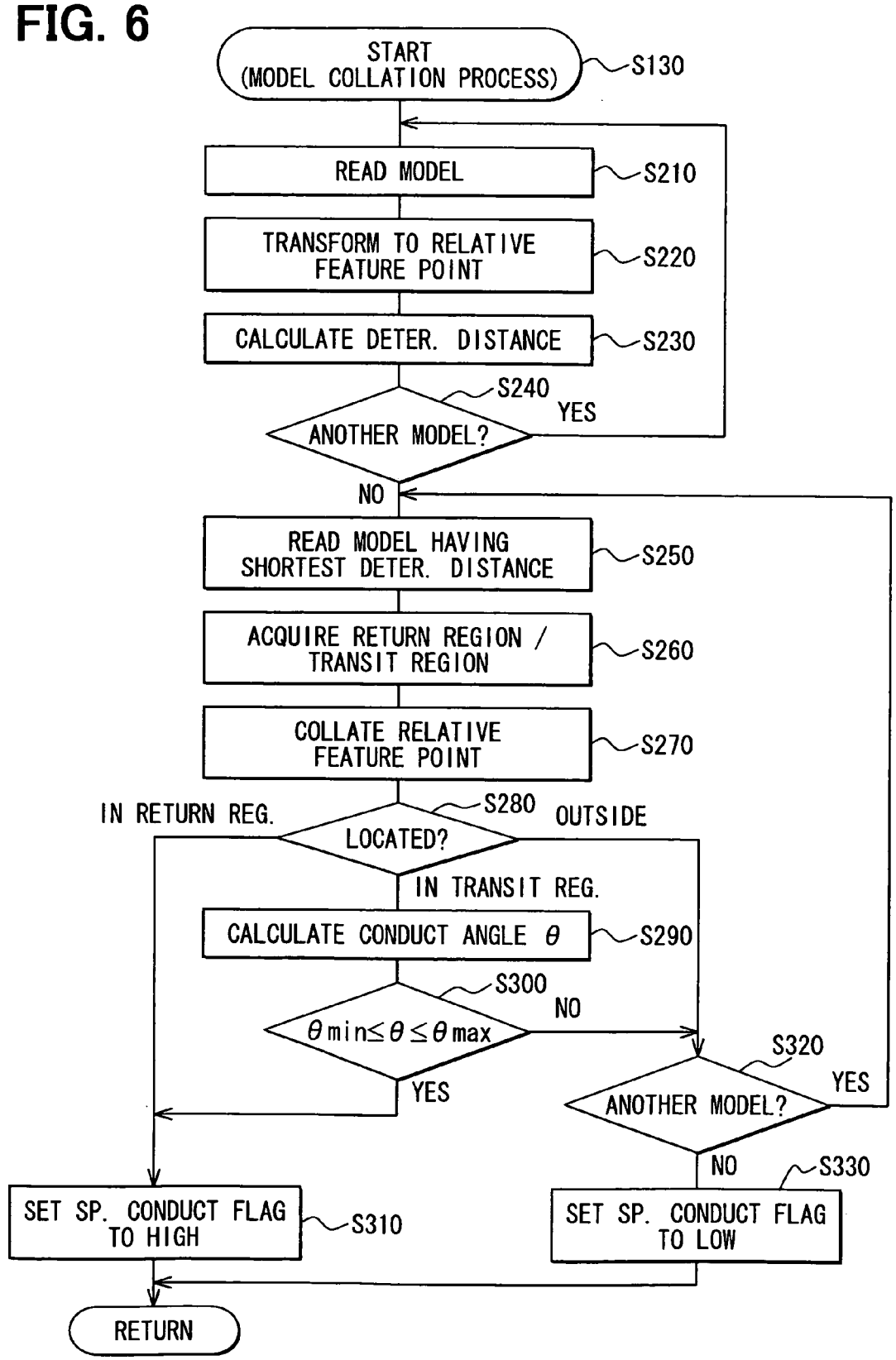
FIG. 6 is a flowchart of a model collation process.

FIG. 6 is a flowchart of a model collation process. As illustrated in FIG. 6, when the model collation process is started at S130 of the conduct inference process, one conduct inference model is read at S210 from the conduct inference model group stored in the ROM 10a.

At S220, the feature point detected by the above conduct inference process is transformed into the coordinates on a relative coordinate system having, as the origin, the return point of the conduct inference model read at S210. Hereinbelow, a feature point after the transformation is referred to as a relative feature point.

For instance, in the present embodiment, a relative feature point is obtained as follows. If the specific conduct designated in the conduct inference model is the telephone using conduct, a relative feature point is obtained by subtracting the coordinates of the tragus point of the ear from the coordinates of the wrist. If the specific conduct is the smoking conduct, it is obtained by subtracting the coordinates of the middle point between the right and left corners of the mouth from those of the wrist. Furthermore, if the specific conduct is the massaging conduct, a relative feature point is obtained by subtracting the coordinates of the middle point between the shoulder and the elbow or the middle point between the elbow and the wrist from the coordinates of the wrist.

At S230, a distance is calculated between the feature point detected by the above conduct inference process and the return point of the conduct inference model read at S210. That is, the distance hereinafter referred to as a determination distance is obtained between the relative feature point and the origin.

Herein, each pair of (i) the coordinates of the relative feature point obtained at S220 and (ii) the determination distance obtained at S230 is associated with the conduct inference model used for obtaining it; then, only the prescribed number (for example, 20) of pairs from the most recently obtained pair are stored in the RAM 10b.

At S240, it is determined whether all the conduct inference models stored in the ROM 10a are applied to the process from S210 to S230, or whether another conduct model is present. When it is determined that all the conduct inference models are not applied, the processing returns to S210. The conduct inference model which is not yet applied is read, and S220 and S230 are then executed.

When it is determined that all the conduct inference models are applied, the processing proceeds to S250. At S250, a conduct inference model having the shortest determination distance is selected among the conduct inference models obtained at S230, and the coordinates of the relative feature point corresponding to the selected conduct inference model is read. Note that when the processing proceeds to S250 in the second cycle subsequent to the first cycle of the present model collation process, the conduct inference model having the shortest determination distance is selected among the remaining conduct inference models having not selected so far. Then, the coordinates of the relative feature point corresponding to the thus selected model is read.

At S260, the return region and transit region are read with respect to the selected conduct inference model corresponded to by the relative feature point read at S250. At S270, a positional relationship of the relative feature point read at S250 is recognized with respect to the return region and transit region read at S260. That is, at S270, the relative feature point read at S250 is reflected on a map including the return region and transit region read at S260.

At S280, it is determined whether the relative feature point is located inside of the return region, inside of the transit region, or outside of both the regions based on the positional relationship recognized at S270. When the relative feature point is determined to be inside of the transit region, the processing proceeds to S290.

At S290, a conduct angle θ pertinent to the relative feature point is obtained; the conduct angle θ is formed between a movement direction and a conduct direction. The movement direction is an actually detected present direction of the movement of the relative feature point. The conduct direction can be called as a return direction in which a feature point of a person intending to perform a specific conduct passes through the transit region. In other words, a conduct or return direction is from a present position of the feature point to a return point of the corresponding conduct inference model.

For instance, in the present embodiment, a conduct direction corresponds to a target vector M which goes to a return point as the origin from the relative feature point detected in the present cycle or detected in the process applied to the capture image acquired presently. A movement vector N is then obtained based on the relative feature point detected in the present cycle and the relative feature point detected in the previous cycle or detected in the process applied to the capture image acquired immediately previously. The movement vector N has a movement direction and a movement distance with respect to the movement of the relative feature point for a time period of one cycle.

The conduct angle θ is calculated based on the obtained target vector M and movement vector N. The conduct angle θ is obtained by substituting the target vector M and the movement vector N to $\cos^{-1}\{(M \cdot N)/(\|M\|\|N\|)\}$. Note that (M·N) is the inner product of the target vector M and movement vector N, and ||M|| and ||N|| are the length (namely, scalar) of the target vector M and movement vector N, respectively.

At S300, it is determined whether the conduct angle θ obtained at S290 is within a predetermined permission range or tolerance of the conduct direction. For example, in the present embodiment, a lower limit θmin of the conduct direction tolerance is five degrees minus; an upper limit θmax is five degrees plus. In other words, the tolerance of the conduct direction is designated to center on 0 degree with five degrees plus and minus.

When it is determined that the conduct angle θ is within the tolerance of the conduct direction, the processing proceeds to S310. That is, in the present embodiment, the conduct angle θ being closer to 0 degree signifies that the feature point moves straight towards the return point; thereby, the high probability of intending to perform a specific conduct is inferred.

When the relative feature point is determined to be inside of the return region, the processing proceeds to S310. At S310, a specific conduct flag is set to the high level to indicate that the driver intends to perform or has performed (or is performing) the specific conduct specified in the conduct inference model corresponding to the relative feature point read at S250 of the present cycle. Note that such a specific conduct flag is previously prepared for each conduct inference model or specific conduct.

That is, at S310, the specific conduct which the driver intends to perform or has performed is identifiable in the process following S310, i.e., the conduct certification process. The model collation process in the present cycle is then ended, and the processing proceeds to S140, i.e., the conduct certification process.

In contrast, when it is determined that the conduct angle θ is outside of the tolerance of the conduct direction at S300, or when it is determined that the relative feature point is located outside of the return region and transit region at S280, the processing proceeds to S320.

At S320, it is determined whether a determination target is present, i.e., whether any other relative feature point included in one of the conduct inference models is present which is not subjected to the process from S250 to S280 in the model collation process of the present cycle. When it is determined that a determination target is present, the processing returns to S250. When it is determined that a determination target is not present, the processing proceeds to S330.

At S330, a specific conduct flag is set to the low level to indicate that the driver does not intend to perform or has not performed the specific conduct. The model collation process in the present cycle is then ended, and the processing proceeds to S140, i.e., the conduct certification process.

That is, the model collation process first selects conduct inference models, in each of which, an accordance rate between a target vector M and movement vector N is beyond a predetermined value, i.e., the conduct angle θ is within a permission range or tolerance of a detection angle. Among the selected conduct inference models, one conduct inference model having a relative feature point closest to a return point is selected. Thus, it is tentatively determined that the driver intends to perform a specific conduct corresponding to the selected one conduct inference model.

<Conduct Certification Process>

Next, the conduct certification process executed at S140 of the conduct inference process is explained.

Figure 7:
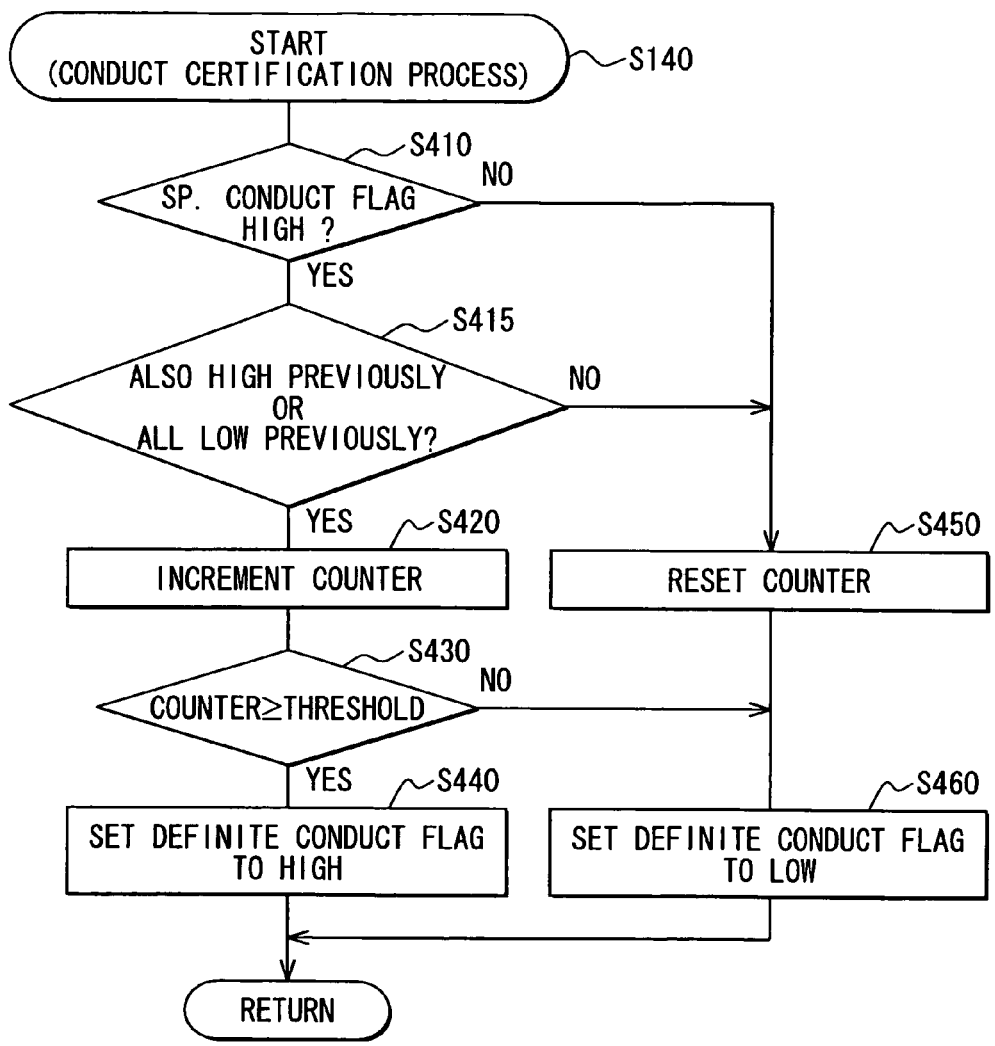
FIG. 7 is a flowchart of a conduct certification process.

FIG. 7 is a flowchart of a conduct certification process. The conduct certification process is executed at S140 of the conduct inference process. First, at S410, it is determined whether the specific conduct flag is set to the high level. When the specific conduct flag is set to the high level, the processing proceeds to S415. That is, if any one of all the specific conduct flags is set to the high level at S310 in the model collation process in the present cycle, the processing proceeds to S415.

At S415, it is determined whether the specific conduct flag set to the high level in the present cycle is set to the high level in the previous cycle, or whether all the specific conduct flags are set to the low level in the previous cycle. When either determination is fulfilled, the processing proceeds to S420.

At S420, a counter for the corresponding conduct inference model is incremented by one (1), and the processing proceeds to S430. At S430, it is determined whether the counter is greater than or equal to a predetermined threshold value. Note that such a predetermined threshold value is equivalent to the number of capture images captured for 0.5 second, for example. That is, at S430, it is determined whether that driver's intending to perform the specific conduct is successively or sequentially determined in the predetermined cycles up to the present cycle.

When the counter for the conduct inference model is greater than or equal to the predetermined threshold value, i.e., when it is determined that the driver's intending to perform the specific conduct has continued for all the corresponding predetermined time period, the processing proceeds to S440. At S440, a definite specific conduct flag is set to the high level to indicate that the driver intends to perform or has performed the specific conduct corresponding to the definite specific conduct flag. The definite specific conduct flag is previously prepared for every conduct inference model or specific conduct. The definite specific conduct flag set to the high level indicates that the driver intends to perform or has performed the specific conduct. The definite specific conduct flag set to the low level indicates that the driver does not intend to perform the specific conduct.

The model certification process in the present cycle is then ended, and the processing proceeds to S150, i.e., the conduct inference process. When it is determined that the specific conduct flag is set to the low level at S410, or when neither is fulfilled at S415 (i.e., when another specific conduct flag designated to another conduct inference model is set to the high level in the previous cycle), the processing proceeds to S450. At S450, all the counters for all the conduct inference models are reset to initial values (for example, zero (0)). The processing then proceeds to S460.

When the counter for the conduct inference model is less than the predetermined threshold value, or when the driver's intending to perform the specific conduct does not continue for the corresponding predetermined time period, the processing proceeds to S460. At S460, all the definite specific conduct flags are set to the low level by regarding that the driver does not intend to perform or has not performed any specific conduct.

The model certification process in the present cycle is then ended, and the processing proceeds to S150, i.e., the conduct inference process. That is, in the conduct certification process, when that driver intends to perform the specific conduct is determined sequentially in the predetermined cycles up to the present cycle, the specific conduct which the driver intends to perform is determined to be probable. The definite specific conduct flag is thereby set to the high level.

<Operation of Conduct Inference Apparatus>

Next, an example of an operation of the conduct inference apparatus 1 is explained.

Figure 9:
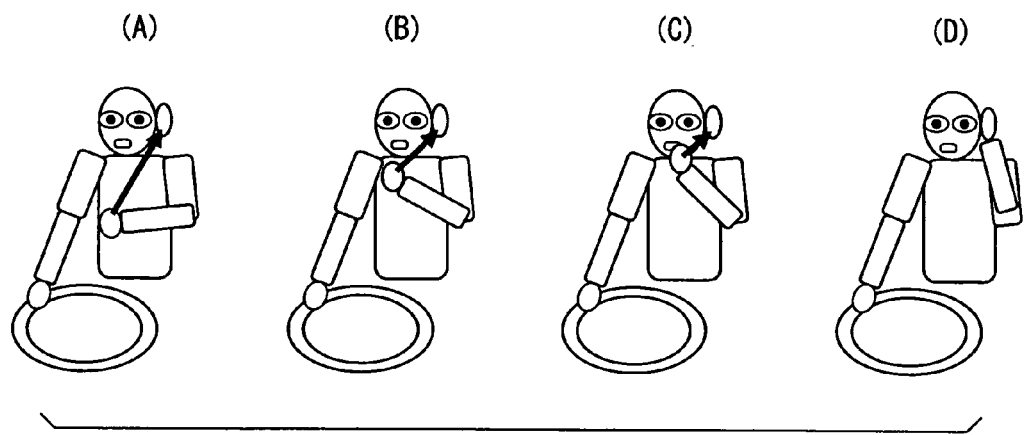
FIG. 9 is a diagram illustrating a bodily movement.
Figure 10:
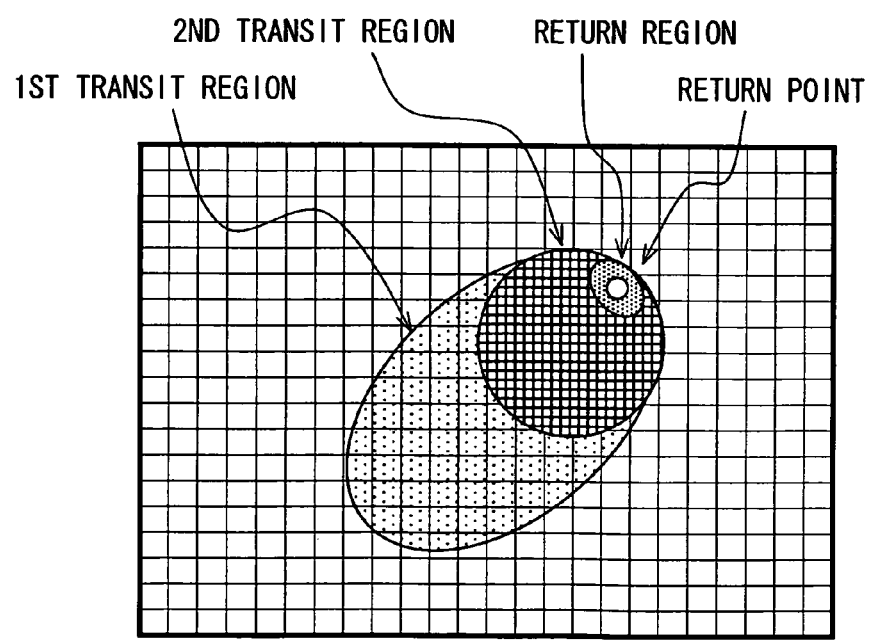
FIG. 10 is a diagram illustrating a transit region, a return region, and a return point designated in a conduct inference model.

FIG. 9 illustrates, as an example of movement, a series of transit or bodily movement of the left hand of a driver in a telephone using conduct in which the left hand is put on the left ear. The movement takes place from the state where the driver starts to perform the telephone using conduct to the state where the driver has performed or is performing the telephone using conduct, i.e., calling. FIG. 10 schematically illustrates a map including a return point, a return region, and a transit region of the left wrist, with respect to the conduct inference model for detecting a telephone using conduct in which the left hand is put on the left ear.

The conduct inference process is executed by acquiring a series of capture images, which captures the transit of the movement of the left hand, from the state where the driver has started a preparatory movement for the telephone using conduct in (A) of FIG. 9 to the state where the driver is performing the telephone using conduct in (D) of FIG. 9.

Again, in (A) of FIG. 9, the driver or the left hand is in a start state where the driver or the left wrist has just started a preparatory movement for performing the telephone using conduct; thus, the feature point is located outside of the transit region and the return region. In (B) of FIG. 9, the driver or the left wrist is in a transit state referred to as a first intermediate state where the left wrist is moving toward the return point; thus, the feature point is located inside of a first transit region. In (C) of FIG. 9, the driver or the left wrist is still in a transit state referred to as a second intermediate state where the left wrist is further moving toward the return point; thus, the feature point is located inside of a second transit region. Then, in (D) of FIG. 9, the driver or the left wrist has performed and is performing the telephone using conduct while the left wrist is located in the return point, which is referred to as a performing state. Thus, the feature point is located inside of the return point or the return region.

In the conduct inference process, when acquiring a capture image representing the state in (A) of FIG. 9, it is recognized that the relative feature point obtained in the capture image is outside of the transit region. That is, the relative feature point is located outside of the transit region as illustrated in FIG. 10. Accordingly, the conduct inference apparatus 1 determines that the driver does not intend to perform the telephone using conduct, then acquiring the following capture image.

Next, capture images are acquired which represent the states in (B) and (C) of FIG. 9 to include from the first intermediate state to the second intermediate state. Herein, the relative feature point is inside of the transit region. That is, the relative feature point is located inside of the first transit region or second transit region as illustrated in FIG. 10. The conduct inference apparatus 1 thereby determines whether the movement direction is along the conduct direction each time the capture image is acquired.

When it is determined that the movement direction is along the conduct direction, it is tentatively determined that the driver intends to perform the telephone using conduct. When such a tentative determination continues for a predetermined time period or predetermined multiple cycles, or when the driver continues to intend to perform the telephone using conduct, it is determined or certified that it is reliable or probable that the driver intends to perform the telephone using conduct.

Thus, the conduct inference apparatus 1 can recognize in advance that the driver intends to perform the telephone using conduct before acquiring the capture image in (D) of FIG. 9 showing the performing state of the telephone using conduct. In other words, the intention of the telephone using conduct can be recognized while the preparatory movement takes place as shown in (B) and (C) of FIG. 9 based on the map or model shown in FIG. 10.

(Effect)

As explained above, in the conduct inference process, whether the driver imaged in the capture image intends to perform a specific conduct can be determined in the stage where the feature point is located in the transit region before reaching the return region.

Therefore, according to the conduct inference apparatus 1 of the present embodiment, whether the driver intends to perform a specific conduct is detectable at the time of the preparatory operation or movement before the driver actually performs the specific conduct. Accordingly, according to the conduct inference apparatus 1, an alarming process such as outputting an alarm to the driver so as to provide the vehicle or the driver with the safe driving can be performed in advance before the specific conduct is actually performed.

In addition, according to the conduct inference apparatus 1 of the above embodiment, in the conduct certification process, when in the conduct certification process that the driver's intending to perform the specific conduct is determined sequentially in the predetermined multiple cycles, it is certified or determined that the specific conduct the driver intends to perform is probable, i.e., the specific conduct probably takes place. An incorrect alarm can be thus prevented even if intending to perform the specific conduct is accidentally determined only in the single cycle.

That is, according to the conduct inference apparatus 1, in such a case, the conduct inference apparatus 1 assumes that intending to perform the specific conduct is incorrectly determined. This can help prevent that the driver feels uncomfortable when an alarm is incorrectly or uselessly outputted.

Furthermore, in the conduct inference apparatus 1 of the above embodiment, when the relative feature point is located in the return region, it is determined that the specific conduct is being performed. An incorrect determination may be made during the preparatory movement stage relative to the specific conduct. Even in such a case, according the conduct inference apparatus 1, just before the detected feature point reaches the return point, the inference result can be promptly corrected to the correct one.

Other Embodiments

Up to this point, description has been given to an embodiment of the present invention. However, the present invention is not limited to the above embodiment, and it can be variously embodied without departing from the subject matter of the present invention.

At S160 of the conduct inference process in the above embodiment, based on the determination at S150 that the specific conduct the driver intends to perform is probable, the control instruction is outputted to the navigation apparatus 21, which then starts the alarm process to output an alarm. Another warning process other than the alarm process can be executed at S160.

For example, the CPU 10*c* may output a control instruction to the seatbelt fastening device 22, thereby increasing a binding force of the seatbelt. The CPU 10*c* may output a control instruction to the braking device 23, thereby increasing a braking force of the subject vehicle. Furthermore, the CPU 10*c* may output a control instruction to the power train control device 24, thereby slowing down the speed of the subject vehicle. Yet further, the above-mentioned warning processes including the alarm process can be combined in various manners as needed.

That is, when it is determined that the specific conduct the driver intends to perform is probable, the following warning process can be adopted. Such a warning process is only required to make the driver to recognize that intending or performing the specific conduct is dangerous to thereby control or maintain the subject vehicle traveling safely.

The model collation process from S250 to S310 of the above embodiment first selects conduct inference models corresponding to the relative feature point, which is located within the transit region and has the movement vector along the target vector of the corresponding conduct inference model. The model collation process then selects from the first selected conduct inference models, a probable conduct inference model having the shortest determination distance. The method of inferring a probable conduct inference model or a probable specific conduct is not limited to the foregoing. For example, the model collation process may first select conduct inference models corresponding to a relative feature point located within the transit region, and may second select from the first selected ones a probable conduct inference model having a highest accordance ratio between the movement vector and target vector.

Note that having a higher accordance ratio signifies that the movement vector is more parallel with the target vector, i.e., that an intersecting angle thereof is closer to zero (0). Thus, a probable specific conduct or a probable conduct inference model is designated as having the much higher accordance ratio. The inference accuracy of the specific conduct of the driver can be raised.

The model collation process at S290 obtains as a target vector a vector connecting a relative feature point to a return point each time the relative feature point is obtained. Herein, target vectors may be individually predetermined for every points in the transit region as directions which moves towards corresponding target points other than the return point. In such a case, the conduct inference model needs to designate the target vectors as conduct directions for every points.

In addition, in the above embodiment, specific conducts referred to as detection targets include a telephone using conduct, a smoking conduct, and a massaging conduct. The detection conduct needs not be limited to the foregoing. That is, any specific conduct can be designated as a detection target if a feature point converges to a return point or its proximity while passing through a transit region along a predetermined movement direction.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the disclosure described herein are set out in the following clauses.

As an aspect of the disclosure, a conduct inference apparatus is provided as follows. A capture image acquiring means is configured for acquiring a capture image, in which a person is imaged, each time the capture image is taken. A feature point detecting means is configured for detecting, as a detection feature point, a feature point, which is designated on a body of the person, in the capture image each time the capture image is acquired. A model storing means is configured for storing at least one conduct inference model which designates a return point, a transit region, and a conduct direction with respect to a specific conduct. The return point is a point at which the feature point of the person is located when the person is performing the specific conduct. The transit region is a region which the feature point passes through towards the return point when the person intends to perform the specific conduct. The conduct direction is a direction in which the feature point moves while passing through the transit region when the person intends to perform the specific conduct. A model extracting means is configured for extracting from the at least one conduct inference model one conduct inference model, in which the detection feature point detected by the feature detecting means is within the transit region and a movement direction of the detection feature point is along the conduct direction. A conduct inferring means is configured for inferring that the person imaged in the capture image intends to perform a specific conduct corresponding to the extracted one conduct inference model.

Under the above configuration, whether a person imaged in a capture image intends to perform a specific conduct can be determined in advance in a stage when the feature point is in the transit region before reaching the return point. In other words, intension of the specific conduct can be determined during a preparatory bodily movement prior to performing the specific conduct.

As an optional aspect of the conduct inference apparatus, the movement direction of the detection feature point may be detected by the feature point detecting means in capture images taken in a predetermined period. The movement direction intersects the conduct direction with an angle. When the angle is within a predetermined range, the model extracting means may regard that the movement direction is along the conduct direction.

As an optional aspect of the conduct inference apparatus, the model extracting means may first extract multiple conduct inference models, in each of which a distance between the detection feature point and the return point is defined. The model extracting means second may extract one conduct inference model, which has a smallest distance among the first extracted multiple conduct inference models. And, the conduct inferring means may infer that the person imaged in the capture image intends to perform a specific conduct corresponding to the second extracted one conduct inference model.

Alternatively, the model extracting means may first extract multiple conduct inference models, in each of which an accordance ratio between a movement direction of the detection feature point and the conduct direction is defined. The model extracting means may second extract one conduct inference model, which has a highest accordance ratio among the first extracted multiple conduct inference models. And, the conduct inferring means may infer that the person imaged in the capture image intends to perform a specific conduct corresponding to the second extracted one conduct inference model.

Herein, since the conduct inference model with a higher accordance ratio is extracted, an inference accuracy for a specific conduct can be enhanced. That is, the specific conduct can be inferred more nearly probably.

In addition, the higher accordance ratio signifies the state where the movement direction of the detection feature point and the conduct direction accord more with each other more or are more parallel with each other.

As an optional aspect of the conduct inference apparatus, a specific model extracting means may be configured for extracting from the at least one conduct inference model one conduct inference model, in which the detection feature point detected by the feature detecting means is in the return point or in a return region. Herein, the return region is a region in which the feature point of the person is located when the person is performing the specific conduct. And, a conduct certifying means may be configured for certifying that the person imaged in the capture image intends to perform a specific conduct corresponding to the conduct inference model extracted by the specific model extracting means.

Under the above configuration, even if performing no specific conduct is incorrectly determined during a preparatory bodily movement actually taking place, the inference result can be corrected immediately when the detection feature point is moved to the return region or return point.

Further, as another aspect of the disclosure, a method is provided for achieving the means included in the above conduct inference apparatus.

It will be obvious to those skilled in the art that various changes may be made in the above-described embodiments of the present invention. However, the scope of the present invention should be determined by the following claims.

What is claimed is:

1. A conduct inference apparatus comprising:
   means for acquiring a capture image, in which a person is imaged, each time the capture image is taken;
   means for detecting, as a detection characteristic point, a characteristic point, which is designated on a body of the person, in the capture image each time the capture image is acquired by the acquiring means;
   means for storing at least one conduct inference model which designates, with respect to a content of a specific conduct, (i) a return point, (ii) at least one transit region assigned to the return point, and (iii) a conduct direction being a direction predetermined with respect to the transit region,
      the return point being a point at which the characteristic point of a person is located when the person performs the specific conduct,
      the transit region being indicated by a coordinate system having an origin at the return point, the transit region being a range through which the characteristic point passes when the person intends to perform the specific conduct,
      the conduct direction in which the feature point moves while passing through the transit region when the person intends to perform the specific conduct;
   means for extracting a conduct inference model from the at least conduct inference model stored in the storing means,
      wherein in the conduct inference model extracted, a relative characteristic point is located within the transit region, the relative characteristic point being a position of the detection characteristic point in the coordinate system having the origin at the return point, and an angle between a movement direction of the detection characteristic point and the conduct direction is within a predetermined range; and
   means for inferring, as a conduct which the person imaged in the capture image intends to perform, a specific conduct corresponding to a conduct inference model that is extracted continuously by the extracting means in times equal to or greater than a predetermined number of times.

2. The conduct inference apparatus according to claim 1, wherein
   when the extracting means extracts a plurality of conduct inference models,
   the inferring means defines, as the conduct inference model extracted by the extracting means, a conduct inference model that is closer to the return point.

3. The conduct inference apparatus according to claim 1, wherein
   when the extracting means extracts a plurality of conduct inference models,
   the inferring means defines, as the conduct inference model extracted by the extracting means, a conduct inference model that has a higher ration in accordance between a movement direction of the detection characteristic point and the conduct direction.

4. The conduct inference apparatus according to claim 1, wherein
   the conduct inference model designates as a return region a region, in which the characteristic point of a person is located when the person is inferred to have performed a specific conduct,
   the conduct inference apparatus further comprising:
   means for extracting a specific model from the at least one conduct inference model, the specific model in which the detection characteristic point detected by the detecting means is in the return point or in the return region; and means for certifying that the person imaged in the captured image performed a specific conduct corresponding to the conduct inference model extracted by the specific model extracting means.

5. The conduct inference apparatus according to claim 1, wherein:

the means for acquiring is arranged in a vehicle for acquiring a captured image of a driver of the vehicle; and the means for storing is configured to store at least one conduct inference model designating specific conduct, which is to be performed by the driver, for affecting vehicle driving safety.

* * * * *